US008832643B2

(12) United States Patent
Schmeling et al.

(10) Patent No.: US 8,832,643 B2
(45) Date of Patent: Sep. 9, 2014

(54) COMPOSITION OF NON-FUNCTIONAL CONCERNS

(75) Inventors: Benjamin Schmeling, Seeheim-Jugenheim (DE); Anis Charfi, Darmstadt (DE)

(73) Assignee: SAP AG, Walldorf (DE)

(*) Notice: Subject to any disclaimer, the term of this patent is extended or adjusted under 35 U.S.C. 154(b) by 198 days.

(21) Appl. No.: 13/535,689

(22) Filed: Jun. 28, 2012

(65) Prior Publication Data

US 2014/0007041 A1    Jan. 2, 2014

(51) Int. Cl.
*G06F 9/44* (2006.01)
*G06F 9/445* (2006.01)

(52) U.S. Cl.
USPC ........... 717/105; 717/101; 717/104; 717/106; 717/170; 717/174

(58) Field of Classification Search
CPC .............. G06F 8/10; G06F 8/20; G06F 8/30; G06F 8/40; G06F 8/70; G06F 9/00; G06F 9/44; G06F 11/3604; G06F 11/3616; G06F 11/3672; G06F 11/3684; G06F 8/60; G06F 8/355; G06F 11/36
See application file for complete search history.

(56) References Cited

U.S. PATENT DOCUMENTS

| | | | |
|---|---|---|---|
| 8,589,863 B2* | 11/2013 | Dan et al. ................. | 717/104 |
| 2006/0174222 A1* | 8/2006 | Thonse et al. ............. | 717/106 |
| 2006/0248121 A1* | 11/2006 | Cacenco et al. ........... | 707/200 |
| 2008/0127047 A1* | 5/2008 | Zhang et al. .............. | 717/104 |
| 2010/0031247 A1* | 2/2010 | Arnold et al. ............. | 717/174 |
| 2010/0153906 A1* | 6/2010 | Dan et al. ................. | 717/104 |
| 2010/0211926 A1* | 8/2010 | Dan et al. ................. | 717/104 |
| 2011/0302550 A1* | 12/2011 | Jackson et al. ............ | 717/104 |
| 2012/0066663 A1* | 3/2012 | Adhikary et al. .......... | 717/104 |
| 2012/0066671 A1* | 3/2012 | Adhikary et al. .......... | 717/170 |
| 2012/0079450 A1* | 3/2012 | Reech et al. .............. | 717/104 |
| 2013/0055195 A1* | 2/2013 | Weigert .................... | 717/104 |
| 2013/0091484 A1* | 4/2013 | Aryanto et al. ............ | 717/101 |
| 2013/0125088 A1* | 5/2013 | O'Brien .................... | 717/105 |

OTHER PUBLICATIONS

Alexandre Alves et al., Web Services Business Process Execution Language Version 2.0, OASIS, Apr. 2007, retrieved from http://docs.oasisopen.org/wsbpel/2.0/wsbpel-v2.0.html, 264 pages.
The Apache Software Foundation, "Apache Axis2" [online], Apr. 2012, retrieved from http://ws.apache.org/axis2/, 6 pages.
Apache Synapse, "Apache Synapse Enterprise Service Bus (ESB)" [online], Jan. 2012, retrieved from http://synapse.apache.org/, 2 pages.

(Continued)

*Primary Examiner* — Don Wong
*Assistant Examiner* — Anibal Rivera
(74) *Attorney, Agent, or Firm* — Fish & Richardson P.C.

(57) ABSTRACT

Methods, systems, and computer-readable media include actions for composing non-functional concerns to be implemented with an application. In implementations, actions include receiving a requirements model that defines non-functional requirements and non-functional attributes associated with the non-functional requirements, for each non-functional attribute, identifying one or more actions, properties of each action and interdependencies between actions to provide an action model, defining an action composition model based on the action model, the action composition model defining orders of execution of actions and one or more activities, defining an action mapping model, the action mapping model mapping actions and activities to the application, generating computer-executable code based on the action mapping model, the computer-executable code being executable to provide a non-functional concern.

20 Claims, 9 Drawing Sheets

(56) References Cited

OTHER PUBLICATIONS

Steve Battle, "Boxes: Black, White, Grey and Glass Box Views of Web-Services", Hewlett-Packard Company, Feb. 2003, 9 pages.
James Clark et al., "XML Path Language (XPath) Version 1.0", W3C Recommendation, Nov. 16, 1999, 30 pages.
Eclipse, "Eclipse Modeling Framework Project (EMF)" [online], 2012, retrieved on Oct. 25, 2012 from http://www.eclipse.org/modeling/emf/, 3 pages.
Eclicpse, "Graphiti—a Graphical Tooling Infrastructure" [online], 2012, retrieved on Dec. 3, 2012, from http://www.eclipse.org/graphiti/, 2 pages.
"Eclipse IDE" [online] retrieved on Dec. 3, 2012 from http://eclipse.org/, 2 pages.
OMG, "Business Process Model and Notation (BPMN)," Version 2.0, Jan. 2011, 538 pages.
Benjamin Schmeling et al., "Non-functional Concerns in Web Services: Requirements and State of the Art Analysis", Proceedings of the 12th International Conference on Information Integration and Web-based Applications & Services, iiWAS2010, Nov. 2010, 8 pages.
Benjamin Schmeling et al., "Composing Non-Functional Concerns in Composite Web Services", Proceedings of the 2011 IEEE International Conference on Web Services, ICWS'11, Jul. 2011, 8 pages.
Benjamin Schmeling et al., "Composing Non-Functional Concerns in Web Services", Proceedings of the 9th IEEE European Conference on Web Services, ECOWS'11, Sep. 2011, 8 pages.
Eclipse, "Eclipse Modeling Project", [online], 2012, retrieved on Dec. 3, 2012 from http://www.eclipse.org/modeling/, 3 pages.
Lodewijk M.J. Bergmans et al., "Composing Software from Multiple Concerns: A Model and Composition Anomalies," Proceedings of the 22nd International Conference on Software Engineering: Workshop on Multi-Dimensional Separation of Concerns in Software Engineering, ICSE 2000, Jun. 2000, 8 pages.
Mathieu Braem et al., "Isolating Process-Level Concerns Using Padus", Proceedings of the 4th International Conference on Business Process Management, BPM 2006, Lecture Notes in Computer Science 4102, Sep. 2006, pp. 113-128.
Anis Charfi et al., "Aspect-Oriented Business Process Modeling with AO4BPMN," Proceedings of the 6th European Conference on Modeling Foundations and Applications, ECMFA, Jun. 2010, Lecture Notes in Computer Science 6138, pp. 48-61.
Anis Charfi et al., "Reliable, Secure, and Transacted Web Service Compositions with AO4BPEL," Proceedings of the 4th European Conference on Web Services, ECOWS'06, Dec. 2006, pp. 23-34.
Nabor C. Mendonca, "A Loosely Coupled Aspect Language for SOA Applications," International Journal of Software Engineering and Knowledge Engineering, vol. 18, No. 2, pp. 243-262, 2008.
Anthony Nadalin et al., "WS-SecureConversation 1.3", OASIS, Mar. 2007, 22 pages.
Muhammad Naveed et al., "Representing Shared Join Points with State Charts: A High Level Design Approach," World Academy of Science, Engineering and Technology 15, 2006, pp. 80-84.
Santokh Singh et al., "An Architecture for Developing Aspect-Oriented Web Services," Proceedings of the Third European Conference on Web Services, ECOWS'05, Nov. 2005, 11 pages.
Bart Verheecke et al., "Unraveling Crosscutting Concerns in Web Services Middleware," IEEE Software, vol. 23, Issue 1, Jan. 2006, pp. 42-50.
Ingo Weber et al., "Composing Services for Third-party Service Delivery," Proceedings of the 2009 IEEE International Conference on Web Services, ICWS'09, Jul. 2009, IEEE Computer Society, pp. 823-830.
Eric Wohlstadter et al., "A Service-oriented Middleware for Runtime Web Services Interoperability," Proceedings of the IEEE International Conference on Web Services, ICWS'06, IEEE Computer Society, Sep. 2006, pp. 393-400.
Uwe Zdun, "Tailorable Language for Behavioral Composition and Configuration of Software Components," Computer Languages, Systems and Structures Journal, vol. 32, Issue 1, Apr. 2006, pp. 56-82.

\* cited by examiner

COMPOSITION OF NON-FUNCTIONAL CONCERNS

BACKGROUND

When building software systems, developers address both functional concerns (e.g., the core functions of the system) and non-functional concerns (e.g., security, availability, persistence, logging, etc.). For example, and in the case of web services for modern software systems, non-functional concerns such as security, reliable messaging, performance and availability play a role in the adoption of the service based applications.

In some cases, software systems are developed without fully addressing non-functional concerns. The ability to fully address non-functional concerns requires particular knowledge from different domains and an understanding of the composition and interdependencies between non-orthogonal non-functional concerns. For example, a software systems designer or developer may not necessarily be an expert in all non-functional concerns and might not understand their interdependencies, orders and the effect of different compositions.

SUMMARY

Implementations of the present disclosure include computer-implemented methods for composing non-functional concerns to be implemented with an application. Implementations include actions of receiving a requirements model, the requirements model being provided as a computer-readable artifact and defining a plurality of non-functional requirements and non-functional attributes associated with the non-functional requirements, for each non-functional attribute provided in the requirements model, identifying one or more actions, properties of each action of the one or more actions and interdependencies between actions of the one or more actions to provide an action model, defining an action composition model based on the action model, the action composition model being provided as a computer-readable artifact and defining orders of execution of actions and one or more activities, each activity of the one or more activities including a plurality of actions, defining an action mapping model, the action mapping model being provided as a computer-readable artifact and mapping one or more of actions and activities to the application, generating computer-executable code based on the action mapping model, the computer-executable code being executable to provide a non-functional concern, and storing the computer-executable code in computer-readable memory.

In some implementations, receiving a requirements model includes retrieving the requirements model from computer-readable memory.

In some implementations, receiving a requirements model includes receiving user input, defining the requirements model based on the user input, and storing the requirements model in computer-readable memory.

In some implementations, actions further include displaying a graphical interface on a display device, the graphical interface being provided by a computer-executable requirements editor, the user input be received through the graphical interface.

In some implementations, providing an action model includes receiving user input, defining the action model based on the user input, and storing the action model in computer-readable memory.

In some implementations, actions further include displaying a graphical interface on a display device, the graphical interface being provided by a computer-executable action definition editor, the user input be received through the graphical interface.

In some implementations, defining an action composition model includes receiving user input, defining the action composition model based on the user input, and storing the action model in computer-readable memory.

In some implementations, actions further include displaying a graphical interface on a display device, the graphical interface being provided by a computer-executable action composition editor, the user input be received through the graphical interface.

In some implementations, defining an action mapping model includes receiving user input, defining the action mapping model based on the user input, and storing the action mapping model in computer-readable memory.

In some implementations, actions further include displaying a graphical interface on a display device, the graphical interface being provided by a computer-executable action mapping editor, the user input be received through the graphical interface.

In some implementations, activities include at least two actions.

In some implementations, interdependencies between actions include one or more of choice, conflict, mutually exclusive, assistance, requires, precedes and inverse.

In some implementations, the action mapping model maps one or more of actions and activities to one of operations of the application and activities of the application, operations of the application including one or more activities of the application.

In some implementations, the non-functional concerns address one or more of security, logging, reliability and performance of the application.

In some implementations, at least one of the action composition model and the action mapping model is provided in business process modeling notation (BPMN).

In some implementations, the computer-executable code is executable by a proxy that intercepts messages sent to the application, processes the messages based on the non-functional concern to provide processed messages, and transmits the processed messages to the application.

In some implementations, the computer-executable code is executable by a proxy that intercepts messages sent from the application, processes the messages based on the non-functional concern to provide processed messages, and transmits the processed messages to a customer application.

In some implementations, the application comprises a web service.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
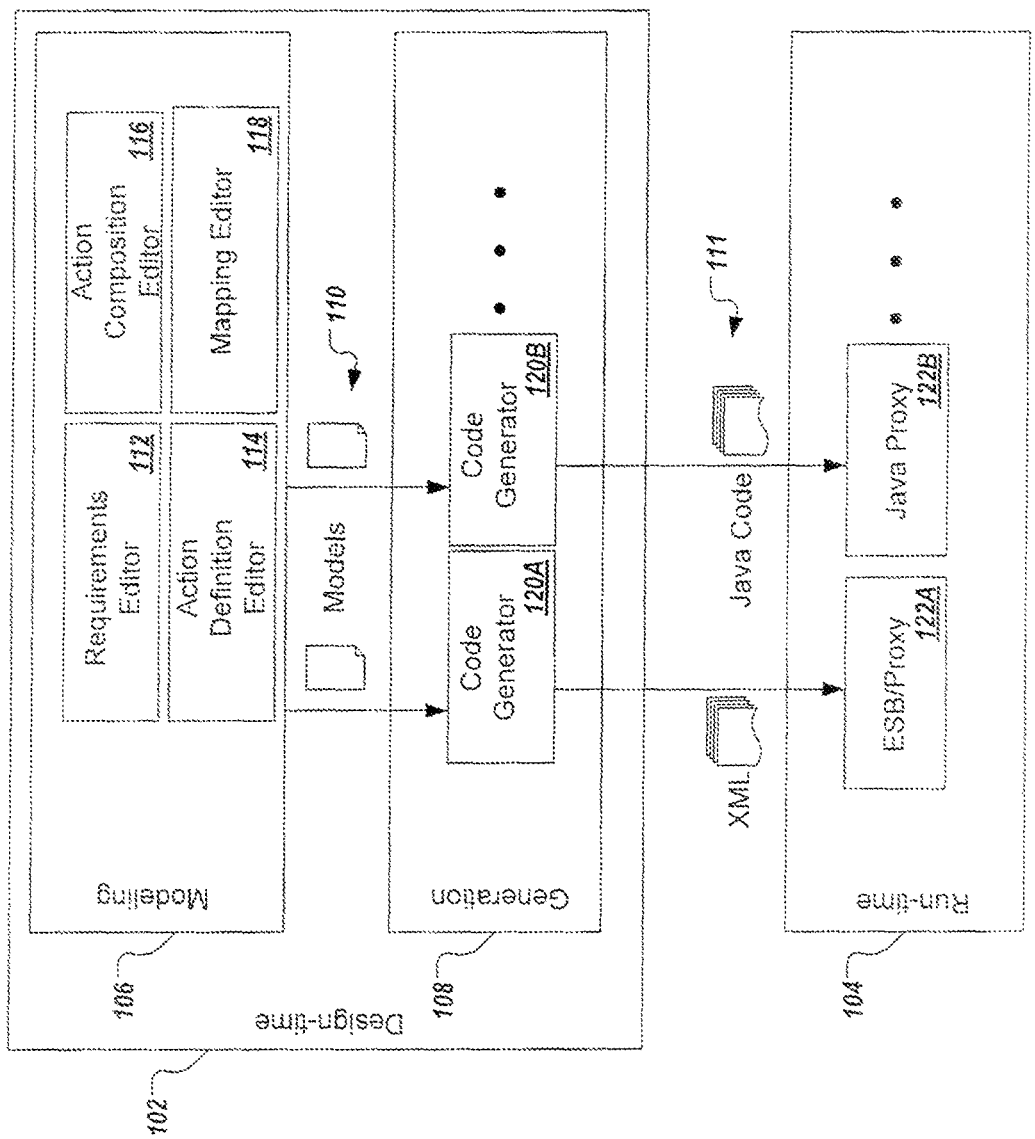
FIG. 1 depicts an example system architecture for composition of non-functional concerns.

Implementations of the present disclosure are generally directed to composing non-functional concerns. More particularly, implementations of the present disclosure are directed to a multi-phase, model-driven approach for the composition of non-functional concerns with each other and with functional parts of applications. In some implementations, the development process includes example phases: a requirements specification phase, an action definition phase, an action composition phase, an action mapping phase and a code generation phase. In some examples, a model is provided as output from one phase and is provided as input to a subsequent phase. In some examples, implementations provide separation of responsibilities between different roles at different phases, discussed in further detail herein. Implementations address both the design-time and run-time of software systems development. Implementations of the present disclosure further provide a toolset and run-time architecture to support efficient composition of non-functional concerns. In some examples, the toolset includes a plurality of editors that provide graphical interfaces for generating models at each phase of the development process.

Before discussing implementations of the present disclosure in further detail, a motivating example will be described to provide context for non-functional concerns composition. The motivating example includes computer-implemented services offered on a service market place. For example, a service provider can implement a service (e.g., as a web service and host it on a particular platform such as a cloud computing platform. Then, the service provider publishes that service on a marketplace, so that customers can find and purchase such service. In some examples, the cloud platform or the marketplace can offer a set of third-party middleware services, which implement non-functional concerns (e.g. accounting, logging, billing, access control etc.). When a service provider deploys a service on the cloud platform or publishes a service on the marketplace, the service provider should be able to select from the middleware services and compose them with the published service to ensure appropriate integration of non-functional concerns.

Several middleware services can be provided for a particular platform or marketplace. Often, a service requires more than one middleware service (e.g., to activate security and logging). If all non-functional concerns of the multiple middleware services were orthogonal to each other, the non-functional concerns could be easily composed by selecting which middleware services should or should not be enabled. In some examples, a non-functional concern is determined to be orthogonal to another non-functional concern if the non-functional concern does not affect and it has no dependencies to the other non-functional concern.

In some cases, non-functional concerns are non-orthogonal to each other. In some examples, a non-functional concern is determined to be orthogonal to another non-functional concern if the non-functional concern is independent from the other non-functional concerns. Non-orthogonal non-functional concerns affect both the specification and the enforcement of the respective non-functional concerns. For example, a service could be enriched with both caching functionality and accounting functionality, which are non-orthogonal, non-functional concerns. If the accounting functionality were executed before the caching functionality, every service invocation would be accounted for. If, however, the caching functionality were executed before the accounting functionality, service invocations that were not cached would also be accounted for. In some examples, the execution order of non-orthogonal, non-functional concerns can be selected based on the concrete application and the concrete use case.

Non-functional concerns can also have data interdependencies (e.g. one non-functional concern could be required to modify a part of a message by encryption and another non-functional concern could be required to read the modified part of the message to log the message). Consequently, the execution order of non-orthogonal, non-functional concerns can cause different effects when composed differently. In some examples, the execution order can depend on the concrete selection of middleware services, the web service they are activated for and/or runtime information.

In some implementations, the order and the dependencies between multiple non-functional concerns can be defined through an explicit specification of the execution order and control flow of the non-functional concerns. For example, one or multiple users (e.g., experts in security, caching and/or accounting) could define the order and the composition logic of the non-functional concerns.

Implementations of the present disclosure are directed to a multi-phase, model-driven approach for the composition of non-functional concerns with each other and with functional parts of applications. Implementations of the present disclosure further provide a toolset and run-time architecture to support efficient composition of non-functional concerns. In some examples, the toolset includes a plurality of editors that provide graphical user interfaces for generating models at each phase of the development process. In the present disclosure, the terms black box view, grey box view and white box view are used in association with applications that are to implement non-functional concerns. In the black box view, the internal details of the application (e.g., business logic—internal data structures and/or algorithms) are unavailable. For example, only information about the input, output and transfer characteristics of the functional logic (e.g., the public interface) underlying the application is visible. In the grey box view, at least portions of the internal details of the application (e.g., business logic—internal process and/or data structures and algorithms) are available. However, in the grey box view, in-depth internal details are unavailable. In the white box view, the complete application details are available (e.g., the source code of the application is provided). Implementations of the present disclosure address each of these example views.

FIG. 1 depicts an example system architecture 100 for composition of non-functional concerns. In the depicted example, system architecture 100 includes a design-time phase 102 and a run-time phase 104. The design-time phase 102 includes a modeling sub-phase 106 and a code generation sub-phase 108. In some examples, the design-time phase 102 implements one or more modules to generate one or more models 110 that express the composition of respective non-functional concerns, and to generate computer program code 111 that is executable to realize the composed non-functional concerns. In the run-time phase 104, the generated computer program code 111 is executed with an associated application to realize the non-functional concerns.

In some implementations, a set of editors are used to generate the models 110 in the modeling sub-phase 106. In the depicted example, the set of editors includes a requirements editor 112, an action definition editor 114, an action composition editor 116 and a mapping editor 118. In some examples, each of the editors can be provided as one or more computer-executable programs that can be executed using one or more computing devices. In some implementations, and as discussed in further detail below, each editor provides a respective graphical user interface (GUI) to receive user input for defining respective models. In some examples, the editors can be provided as individual computer-executable programs. In some examples, the editors can be provided in combination in one or more computer-executable programs. In some examples, the editors can be integrated such that the output of one editor is provided as input to another editor. For example, the action definition editor 114 can import a requirements model from the requirements editor 112, or can import a pre-stored requirements model. As another example, the action composition editor 116 can import an action model provided from the action definition editor 114. As another example, the mapping editor 118 can import an action composition model from the action composition editor 116 to generate an action mapping model.

In some implementations, the requirements model defines requirements for the non-functional concern. In some examples, the requirements can be provided as attributes (e.g., confidentiality, integrity, access control, traceability, response time). In some examples, the attributes can be categorized by non-functional concern (e.g., security, logging, performance). In some implementations, the requirements model, whether generated or received, can be displayed in a GUI of the requirements editor 112, for example, to enable a user (e.g., a requirements engineer) to edit the requirements model.

In some implementations, the action model defines concrete actions that can be executed to achieve requirements provided in the requirements model. In some examples, the action model can be defined by one or more users, each of which can be an expert in one or more domains (e.g., security, logging, performance) of the particular non-functional concern. In some examples, and for multiple non-functional concerns, multiple domain experts can support action definition. In some examples, action definition can be performed using an action definition editor 114, which can provide a GUI for accepting user input to generate the action model. During action definition, users (e.g., one or more domain experts) can identify and specify one or more actions that can be executed to realize a requirement. In some implementations, the users can bind the actions to components that implement the functionality of the respective action (e.g., middleware services).

In some implementations, the action composition model can be generated based on the action model. The order in which actions are performed can yield different effects. Consequently, when more than one action applies to the same functional execution point, the order or control flow of actions must be specified. The action composition model defines the order in which actions are performed to provide one or more action compositions. In some examples, an action composition includes two or more actions. As used herein, the term non-functional activity refers to the composition of two or more non-functional actions. In some examples, the action composition model can be defined using the Business Process Modeling Notation (BPMN), as discussed in further detail below. In this manner, an explicit order of actions can be defined.

In some examples, the action composition model is generated by a domain expert (role) and/or a service provider (role). For example, the domain expert can be an expert in the particular domain (e.g., security, logging, performance) of the particular non-functional concern, for which action compositions are to be defined. In some examples, and for multiple non-functional concerns, multiple domain experts support action definition. In some examples, the service provider is knowledgeable about the underlying application, into which the non-functional concerns are to be implemented. Consequently, the service provider can use this knowledge to help define action execution. In some examples, the action composition editor 116 provides a GUI to receive user input to define the action composition model.

In some implementations, the action mapping model can be generated based on the action composition model. In some implementations, the action mapping model can be generated based on the action model and the action composition model. In some implementations, the action mapping model can be generated further based on an interface definition and/or internal implementation artifacts associated with the underlying application. In some examples, and in the case of web services, the interface definition and/or internal implementation artifacts can be provided as web service description language (WSDL) or BPMN files.

In some examples, to generate the action mapping model, the action compositions and/or individual actions of the action composition model are mapped to functionality of the underlying application. That is, the action mapping model defines an action-to-application mapping. In some examples, and in the black box view, the actions and/or action compositions are mapped to the high-level detail of the application. In some examples, and in the grey box view, the actions and/or action compositions are mapped to specific components of the application. In some examples, and in the white box view, the actions and/or action compositions are mapped to source code segments of the application. In some implementations, the action mapping model is defined by a service provider role. For example, the service provider is knowledgeable about the underlying application, into which the non-functional concerns are to be implemented, and can use this knowledge to help map actions and/or action compositions to functionality of the underlying application. In some examples, the action mapping editor 118 provides a GUI for receiving user input to define the action mapping model.

The models 110 produced during the modeling sub-phase 106 can be used as input for the code generation sub-phase 108. In some examples, the models 110 include action mapping models. In some implementations, one or more code generators 120A, 120B can receive and process respective models 110 during the code generation sub-phase 108. In some implementations, and as discussed in further detail below, the code generators 120A, 120B can have different components corresponding to a particular target platform 122A, 122B, respectively, of the run-time phase 104. Different types of code artifacts can be generated depending on the code generator 120A, 120B and the concrete instantiation in the run-time phase 104.

Figure 2:
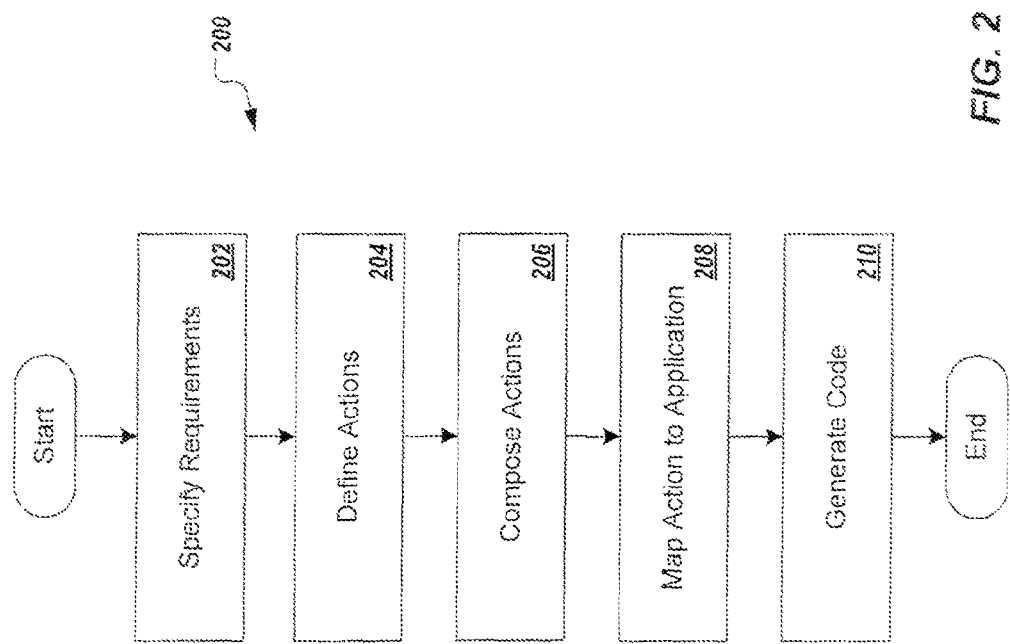
FIG. 2 depicts an example process that can be executed in accordance with implementations of the present disclosure.

FIG. 2 depicts an example process 200 that can be executed in accordance with implementations of the present disclosure. The example process 200 includes example steps that can be executed to model and generate computer-executable code embodying a non-functional concern. In some implementations, the example process 200 can be realized using one or more computer-executable programs that can be executed using one or more computing devices.

Requirements for a non-functional concern are specified (202). In some implementations, a requirements model can be generated (e.g., using the requirements editor 112 of FIG. 1). In some examples, the requirements model is generated by a particular user role (e.g., a requirements engineer role). In some implementations, a pre-defined, pre-stored requirements model is received, alleviating the need to specify requirements. Actions are defined (204). In some examples, the actions are defined based on the requirements model to provide an action model (e.g., using the action definition editor 114 of FIG. 1). In some implementations, the action model is generated by one or more particular user roles (e.g., domain expert roles).

Actions are composed (206). In some examples, a composition of actions is provided based on the action model to provide an action composition model (e.g., using the action composition editor 116 of FIG. 1). In some implementations, the action composition model is generated by one or more particular user roles (e.g., domain expert roles, service provider role). Actions and/or action compositions are mapped to an application (208). In some examples, action mapping is provided based on the action composition model to provide an action mapping model (e.g., using the action mapping editor 118 of FIG. 1).

Computer-executable code for non-functional concerns is generated (210). In some examples, the code is generated based on the action mapping model (e.g., a code generator 120A, 120B of FIG. 1). In some implementations, the computer-executable code is directed to a target platform (e.g., Java or .Net). The computer-executable code is made available for execution (e.g., during the run-time phase 104).

Each of the example phases are now discussed in further detail.

During requirements definition, a requirements engineer, for example, specifies non-functional attributes for each non-functional concern (e.g., security, performance). For example, non-functional attributes such as confidentiality and integrity can be specified for the security concern, while response time can be specified for the performance concern. The requirements model is provided based on the requirements specifications.

In some examples, and after specification of the requirements, one or more respective non-functional domain experts can define the contributing non-functional actions that realize the attributes for each particular concern. For example, encrypt can include a non-functional action that realizes the confidentiality attribute for the security non-functional concern. In some examples, each non-functional action includes properties with respect to composability with other non-functional actions and/or functional concerns. For example, these properties can be subsequently used to support the Service Provider in defining valid action compositions. Example properties can include the name, the non-functional attributes that are satisfied/denied, the direction of messages the action can be mapped to, the impact on the message (e.g., read-only or modify) and the part of the message that is impacted.

In some implementations and after each domain expert has defined actions, interdependencies between the actions can be provided. Example interdependencies can include choice (actions are basically the same), conflict (one action has a positive effect and the other has a negative effect on the same attribute (e.g., encrypt and caching are in conflict because the former increases response time whereas the latter decreases response time)), mutually exclusive (actions exclude each other), assistance (one action supports the other action), requires (the action cannot be executed without the other action), precedes (one action has to be executed before the other action (e.g., authenticate precedes authorize)) and inverse (two actions compensate each other's effects (e.g., decrypt and encrypt).

Figure 3A:
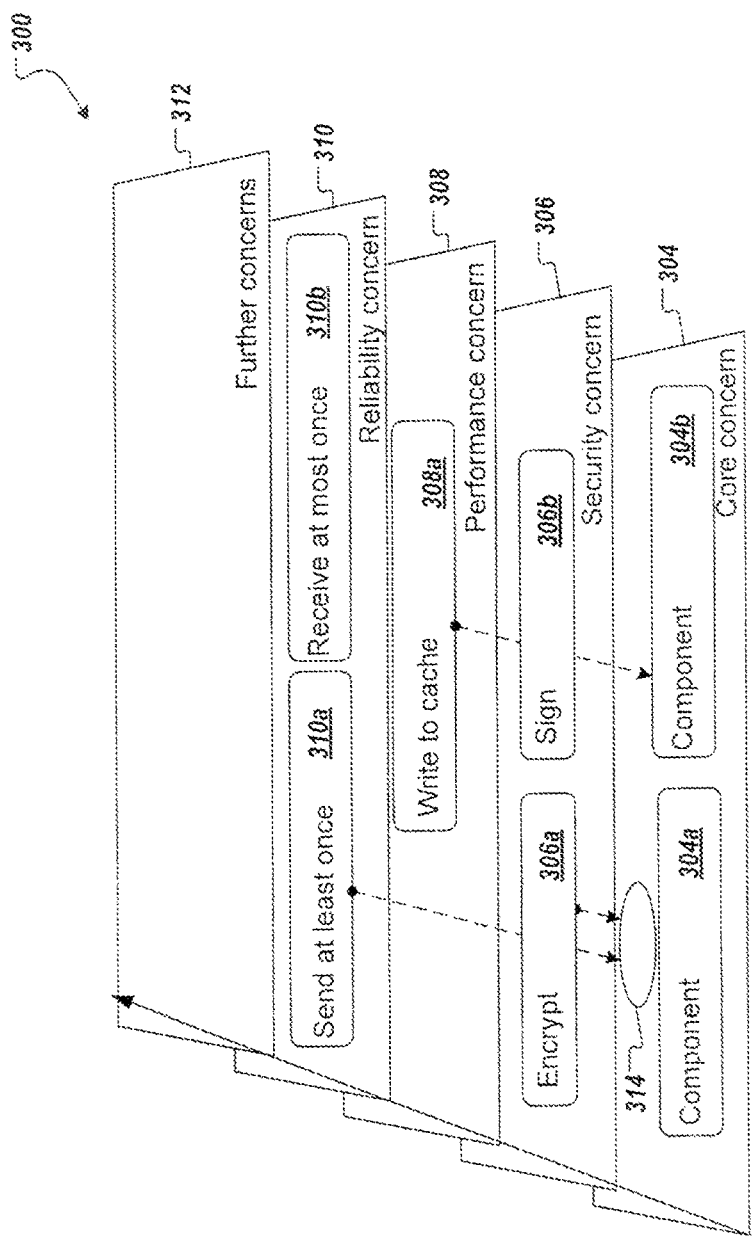
FIGS. 3A and 3B depict example multi-dimensional compositions for black box and grey box views, respectively.
Figure 3B:
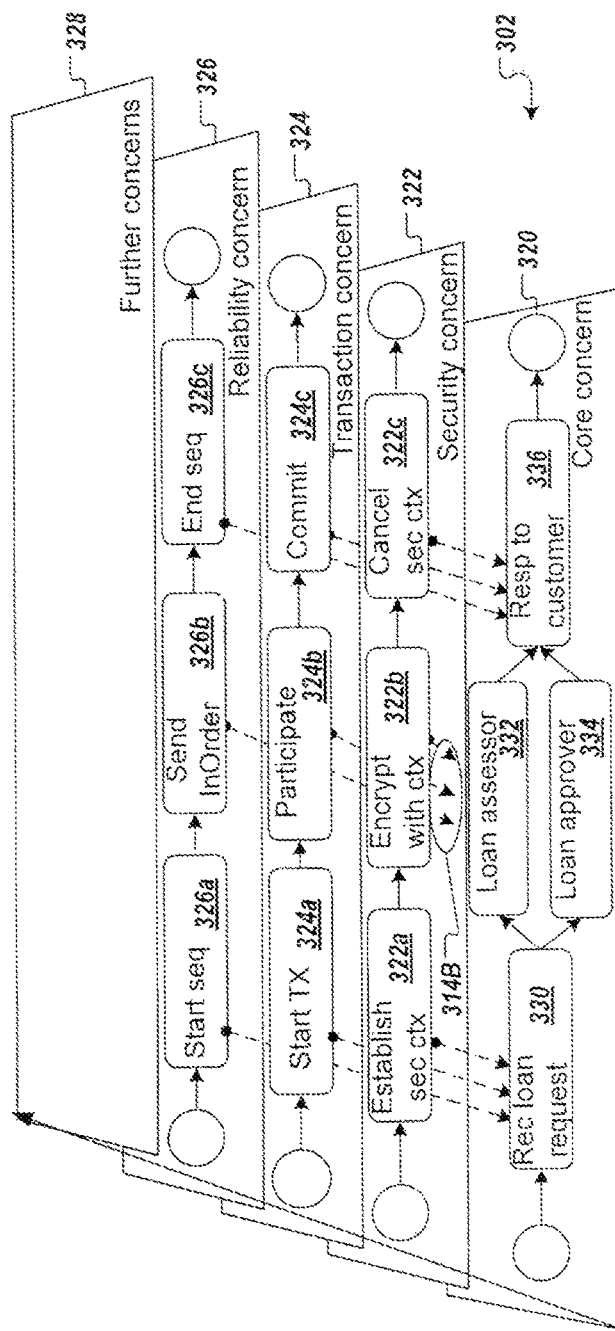

Action composition and mapping provided based on the defined actions and the interdependencies therebetween. Action composition (e.g., to generate an action composition model) and mapping (e.g., to generate an action mapping model) will be discussed in further detail with reference to FIGS. 3A and 3B. FIGS. 3A and 3B depict example representations 300, 302 of multi-dimensional compositions for a black box view and a grey box view, respectively. As noted above, the black box view hides internal details of the underlying application, exposing only its interface, while the grey box view reveals the interface as well as some internal information. In some implementations, each multi-dimensional composition 300, 302 includes a core concern (e.g., functional concern) and one or more non-functional concerns. As discussed in further detail herein, FIGS. 3A and 3B each represent scenarios in which more than one action (or action composition) applies to the same subject of the underlying application. When more than one action applies to the same subject, the order or control flow of actions is specified in the action composition model. This is because, as discussed above, different orders of actions yield different effects.

With particular reference to FIG. 3A, a core concern 304 and non-functional concerns 306, 308, 310, 312 are provided. In the depicted example, the non-functional concerns 306, 308, 310 address security, performance and reliability, respectively, of the underlying core concern 304. The non-functional concern 312 represents other, unspecified non-functional concerns that can be implemented with the core concern 304. In the depicted example, the non-functional concern 306 includes example actions/activities 306a, 306b, the non-functional concern 308 includes an example action/activity 308a, and the non-functional concern 310 includes example action/activity 310a, 310b. In the example of FIG. 3A, the core concern 304 includes high-level components 304a, 304b that make up the underlying application (e.g., web service). That is, detail of the components 304a, 304b is not provided in the black box view.

In the example of FIG. 3A, a point 314 indicates where more than one action/activity will be executed. Consequently, an explicit ordering is provided, as discussed in further detail with reference to FIG. 5. In some implementations, the ordering of action execution is referred to as vertical composition indicating that the composition is performed at one execution point where multiple non-functional actions are contemporaneously executed. In some implementations, a notation of a non-functional activity can be introduced to encapsulate the order as a reusable entity. In some examples, the notation provides a container for a concrete order definition. In some implementations, the non-functional activity is applicable in different scenarios.

With continued reference to FIG. 3A, and in some examples, a reduced set of BPMN elements can be used to define the order of action execution. For example, and although not modeling a business process, the non-functional actions specified during action definition (e.g., 204 in FIG. 2) can act as flow node (FlowNode) elements of BPMN, which can be connected with other flow node elements through BPMN sequence flow (SequenceFlow) connections. In some examples, each activity specifies a single start event, which defines the entry point of the activity. In some examples, each activity specifies a single end event, which can be used to trigger termination of the whole activity.

Referring now to FIG. 3B, a core concern 320 and non-functional concerns 322, 324, 326, 328 are provided. In the depicted example, the non-functional concerns 322, 324, 326 address security, transaction and reliability, respectively, of the underlying core concern 304. The non-functional concern 328 represents other, unspecified non-functional concerns that can be implemented with the core concern 320. In the depicted example, the non-functional concern 322 includes example actions/activities 322a, 322b, 322c, the non-functional concern 324 includes example actions/activities 324a, 324b, 324c and the non-functional concern 326 includes example actions/activities 326a, 326b, 326c. In the example of FIG. 3B, the core concern 3320 includes lower-level detail of components that make up the underlying application (e.g., web service). In the depicted example, tasks 330, 332, 334, 336 of a business process (e.g., a loan approval process), for example, of the core concern are visible in the grey box view.

In the example of FIG. 3B, a point 314 indicates where more than one action will be executed. The composition of multiple non-functional actions into a composite can be defined as horizontal composition. In some examples, non-functional actions can be composed in a similar way as the functional processes (e.g., processes of the core concern 320) and can hence be called composite non-functional actions. In some implementations, the control flow structures and data dependencies of the horizontal non-functional action composition can be similar to the functional composition (e.g., composite web services). That is, a non-functional action composition describes the control and data flow of atomic non-functional behaviors. In some implementations, horizontal non-functional action composition, however, requires additional external events to trigger transitions from one action to another action. For example, the transition in horizontal non-functional actions composition can be triggered by a functional process or service (e.g. the invocation of a certain partner service).

In some implementations, the execution of non-functional actions requires additional data to execute their non-functional behavior. Example types of data that could be required for the execution of non-functional actions can include context data, configuration data and data produced by other non-functional actions. As illustrated in FIG. 3B, data flow can occur both horizontally (e.g., when a secure context is created that exists as long as the process instance) and vertically (e.g., when a timer captures the time it takes to execute all non-functional actions in a vertical composition).

In some examples, both the horizontal and the vertical compositions are described in BPMN2. Consequently, and in some implementations, the data concepts of BPMN2 (e.g., data object (DataObject) and data association (DataAssociation)) can be used to describe data flow. For example, a data object defines a name and a data type. In some examples, a data object can be connected with a non-functional action that produces the data using a data output association (DataOutputAssociation). In some examples, a data object can be connected with one or more non-functional actions that consume the data using a data input association (DataInputAssociation). In some implementations, a data association may also define an assignment logic (e.g. using expression languages like Xpath) to map certain parts of the data to input parameters of the non-functional action.

In action mapping, non-functional actions are mapped to application components. For example, and with reference to FIGS. 3A and 3B, non-functional actions/activities are mapped to components of the underlying core concern. In some examples, the service provider can select a set of software components (e.g., web services) that are to be enhanced with non-functional actions and/or non-functional activities.

With reference to the black box view, the mapping can based on the artifacts/subjects available in the interface description (e.g., provided as a WSDL file) of the underlying application.

With reference to the grey box view, the service provider selects the application that is to be enhanced with non-functional behavior. Artifacts that expose some internal aspects of the application are made available. An example artifact can include a process model that provides the internal process realized by the application. In some examples, the process model can be based on notations such as BPMN.

As introduced above, execution of a non-functional action/activity can be triggered at a well-defined point in the internal process which can be the execution of an event, activity and/or an internal messaging event. In some examples, messages can be produced or consumed by particular types of atomic activities and can be referred to as messaging tasks (e.g., ServiceTask, ReceiveTask, SendTask). In some implementations, a non-functional activity can be directly mapped with a simple connection line (e.g., provided as non-functional association) which points to a BPMN activity or event. Activities in BPMN share a common lifecycle characterizing their operational semantics. When connecting a non-functional action with a task, it might not be clear at which state of the lifecycle the non-functional action should apply. Consequently, additional information can be provided to the mapping. In some examples, the additional information can be realized by providing type information for a non-functional association. Example types can include Before (Activity in Ready state), After (Activity in Completed state) and Message In, Out, In/Out, Fault. In some examples, the Before and After types are not messaging-related and can be used for non-functional actions that do not produce or consume any messages (e.g., a non-functional action establishing or canceling a secure conversation context). In some examples, non-functional actions mapped with messaging-related types can have implicit access to the current message (e.g., required by non-functional activities that encrypt messages). In some examples, and within a graphical representation of the mapping, different types can be shown by dedicated symbols that decorate the connection line.

Referring now to the white box view, mapping can be based on all available code artifacts such as source code or models representing the source code. Subjects, to which non-functional actions can be mapped, can include function-, method- or constructor/deconstructor invocations and/or variable assignments, among others. Actions can be mapped to those programming statements in general (e.g., for each method with a certain name) or to invocations in a specific context (e.g., in a specific execution flow through the program or only when called from a certain object or class).

As discussed in further detail herein, computer-executable code can be generated that embody the non-functional concerns. In some examples, the action mapping model is provided to a code generator (e.g., 120A, 120B of FIG. 1) to generate the code. In some examples, generated artifacts can include code artifacts and/or configuration artifacts.

Implementations of the present disclosure will be illustrated by way of an example application for which a plurality of non-functional concerns are to be applied. The example application will be discussed with reference to FIGS. 4-7, which depict respective GUIs provided by respective editors, discussed herein. The example application includes a purchase order service, provided as a web service, that enables customers to order goods from online stores.

In some examples, the purchase order service provides a plurality of operations via a plurality of respective port types. In the instant example, the operations can include a send purchase order (sendPurchaseOrder) operation, a send invoice (sendInvoice) operation and a get available items by category (getAvailableItemsByCategory) operation. In some examples, the sendPurchaseOrder operation implements a typical order purchasing process. The consumer of this order purchasing process can include a customer who wants to purchase some items. The input of this operation can include customer information (e.g., customer name, address, etc.) and order information (e.g., the items ordered including item identifier, name, price, etc.). The output of the sendPurchaseOrder operation can include an invoice identifying, for example, all purchased items, the total price of items purchased, etc. The sendInvoice operation can, for example, enable external generation of the invoice (e.g., by partners of the service provider) and inclusion of this information during execution of the sendPurchaseOrder operation. The getAvailableItemsByCategory operation can, for example, enable users to retrieve a list of the available items, by category, that can be purchased.

Although the example purchase order service can be implemented and executed without non-functional requirements, non-functional requirements should be addressed in order to promote broad adoption (e.g., use) of the service. Example non-functional requirements can include: confidentiality of the customer and invoice data such that it cannot be accessed by unauthorized entities (Security), prohibiting modification of the order and invoice data to avoid, for example, man-in-the-middle-attacks (Security), the purchase order operation can only be called by authenticated consumers (Security), availability of purchase history for each customer (Traceability), and acceptable performance of operations (e.g., getAvailableItemsByCategory) that are frequently used by several customers (Performance). In some examples, a requirements engineer describes these requirements as non-functional attributes and models (e.g., using the requirements editor 112 of FIG. 1) to provide a requirements model.

After defining the non-functional requirements for the example purchase order service, the requirements can be delegated to respective non-functional domain experts. The domain experts deduce possible actions that can be performed in order to support the set of requirements. For example, a security expert knows how to achieve confidentiality and integrity for web services. Consequently, the security expert can define actions including, for example, encrypting messages (satisfying the confidentiality attribute) that are sent by the service, and signing messages (satisfying the integrity attribute). The security expert can further add decryption and verification of signatures as actions for supporting incoming messages which are signed or encrypted. The security expert can further define properties for each of the actions provided.

In some examples, the security expert can decide to use plain (unencrypted) signatures and not to encrypt the header of the message but only the message body. Further, the security expert can provide that the signature should sign the plain message body and not the encrypted message body. Consequently, a precedes interdependency can be provided as: precedes(Sign, Encrypt). Furthermore, inverse interdependencies can be provided as: inverse(Encrypt, Decrypt) and inverse(Sign, VerifySignature).

In some examples, a logging expert defines an action log, and a performance expert defines actions for writing frequent messages to a cache and for retrieving the messages from the cache using the parameters of the message as key.

After defining the actions from different non-functional domains, the domain experts (e.g., in collaboration) can determine interdependencies across non-functional domains. In some examples, the domain experts can use the impact properties to systematically determine interdependencies. For example, the encrypt action will change the message body into an unreadable string having an impact on all actions that need to read the message body (e.g., readFromCache requires reading of the parameters). By this methodology the following example cross-domain interdependencies can be provided: precedes(Decrypt, readFromCache), precedes(Authenticate,Decrypt), precedes(writeToCache, encrypt), precedes(Log,Encrypt), precedes(Decrypt, Log).

Figure 4:
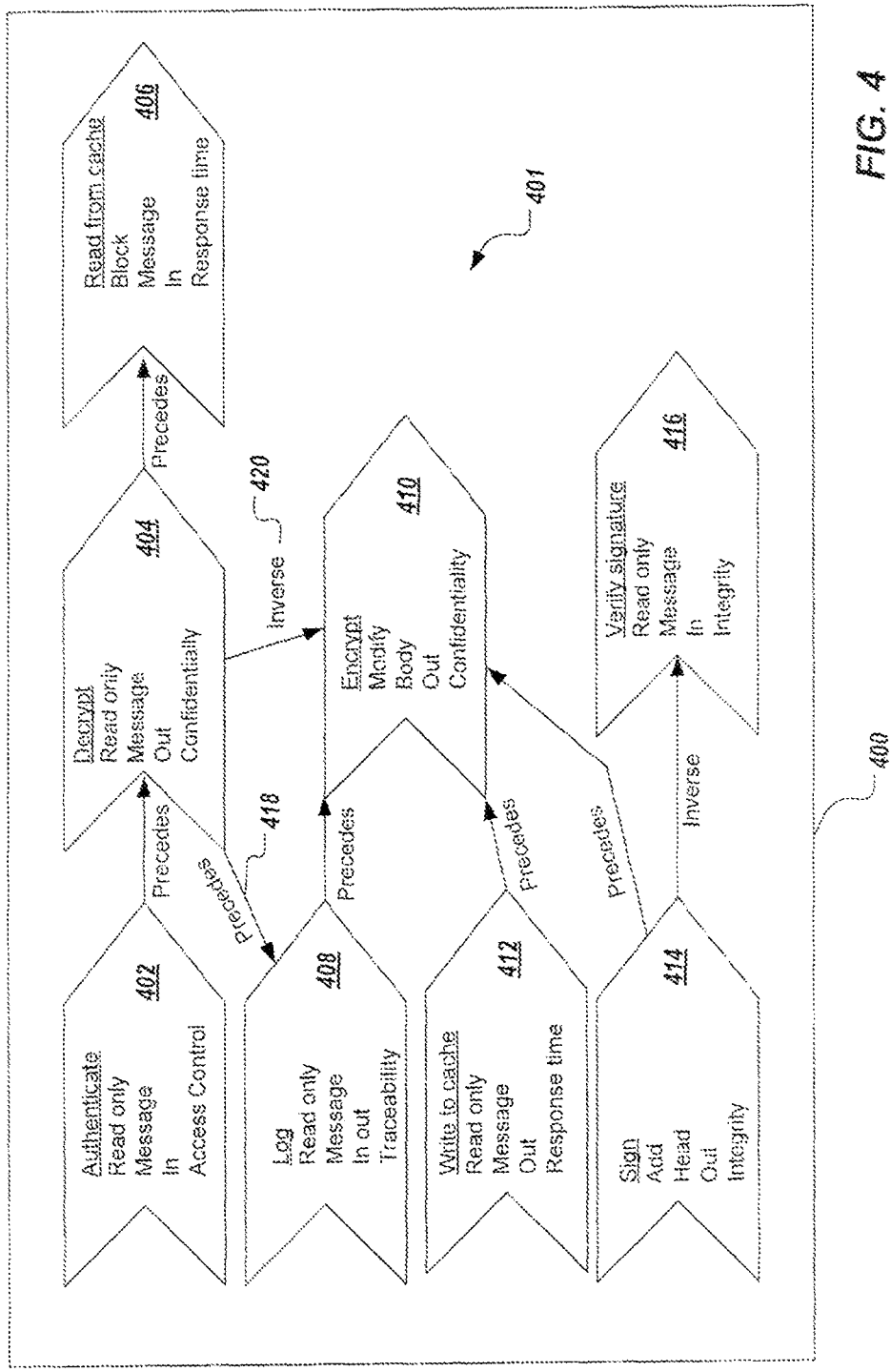
FIG. 4 depicts an example graphical user interface for defining an action model.

An example action model that results from the above-discussed action definition is depicted in FIG. 4. More particularly, FIG. 4 depicts an example graphical interface 400 for displaying an action model 401. In some examples, the graphical interface 400 can be provided by a computer-executable editor (e.g., the action definition editor 114 of FIG. 1). The example action model 401 includes actions defined by the domain experts, as discussed above, and include authenticate 402, decrypt 404, read from cache 406, log 408, encrypt 410, write to cache 412, sign 414 and verify signature 416. The action mode 401 includes a list of properties for each of the multiple actions (e.g., read only, message, in, access control for authenticate action 402). The action model 401 also includes the interdependencies between actions (e.g., precedes 418, inverse 420).

In some examples, each of the example domain experts can provide user input through the graphical interface 400 to define the actions, properties of the actions and interdependencies between actions to define the action model 401. In some examples, each domain expert can use a respective graphical interface 400. For example, the security expert can use the graphical interface 400 to define the authenticate, decrypt, encrypt, sign and verify signature actions, the logging expert can use the graphical interface 400 to define the log action, and the performance expert can use the graphical interface 400 to define the write to a cache and the read from cache actions. In some implementations, the multiple experts can collaborate (e.g., through respective graphical interfaces 400) to define the interdependencies between actions.

Figure 5:
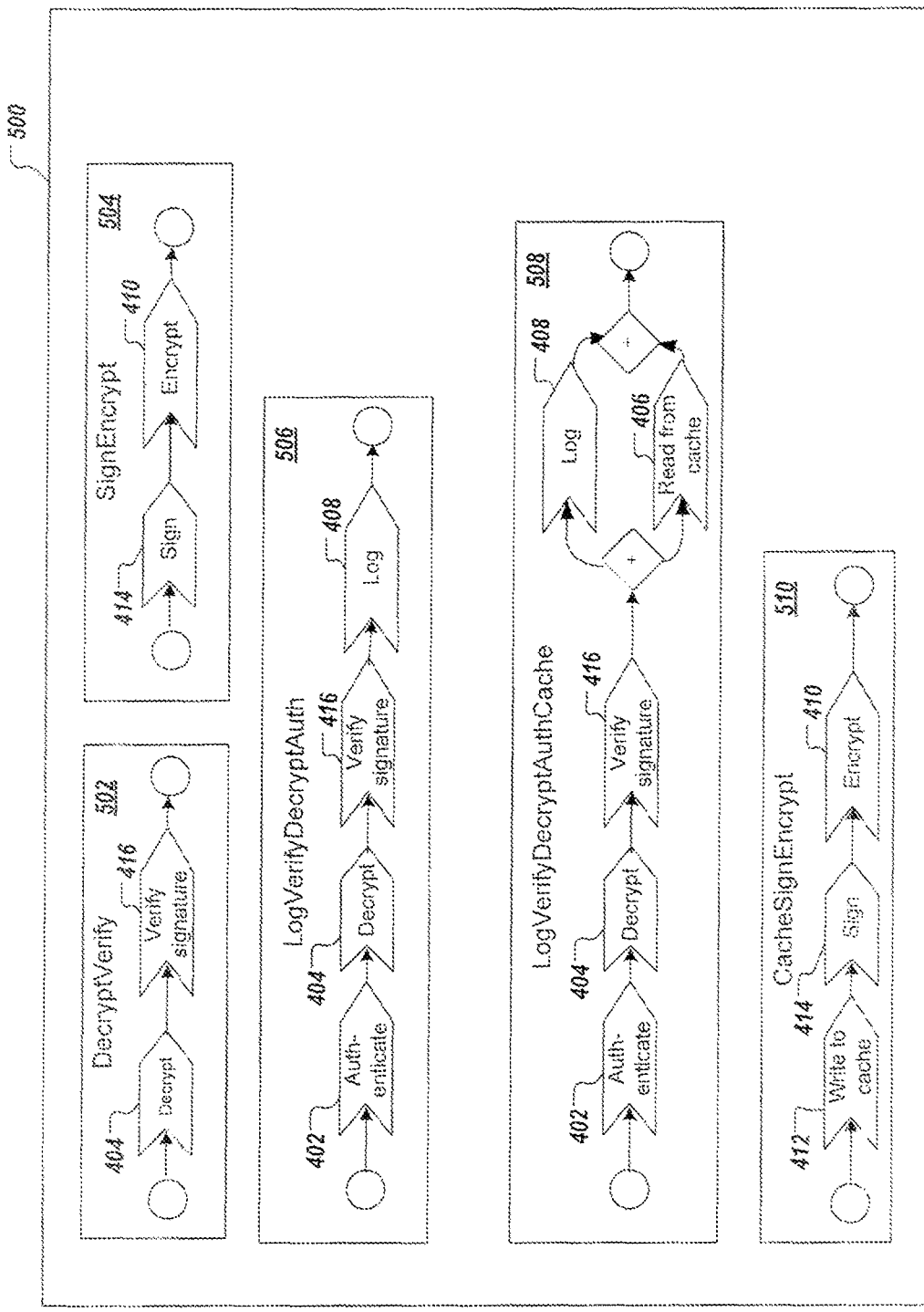
FIG. 5 depicts an example graphical user interface for defining an action composition model.

Referring now to FIG. 5, an execution order of the non-functional actions can be defined based on the action model. More specifically, after the definition of non-functional actions (e.g., in the action model 401), the service provider defines the order in which the actions should be executed. This task is non-trivial because the service provider might not be an expert in any of non-functional domains concerned (e.g., security, traceability, performance). Further, knowledge of multiple non-functional domains is required. Accordingly, the knowledge of multiple non-functional domains is available in the form of the non-functional actions, properties of non-functional actions and the interdependencies of non-functional actions provided in the action model. In some examples, the service provider can model the non-functional activities using BPMN, as discussed herein.

FIG. 5 depicts an example graphical user interface 500 for generating an action composition model. In some examples, the graphical user interface 500 can be provided by a computer-executable editor (e.g., the action composition editor 116 of FIG. 1). In some examples, the service provider can provide user input through the graphical interface 500 to compose actions defined in the action model into non-functional activities. In the depicted example, the graphical interface 500 displays a non-functional activity 502, 504, 506, 508, 510 defined by the service provider and based on the atomic activities provided in the action model. In some examples, and during composition of the non-functional activities, the editor can validate the activity whenever a change is introduced via the graphical interface 500 (e.g., a new non-functional action is added or the process logic is changed) and can provide the user with direct feedback of the non-functional concerns composition.

In some implementations, a particular service provider can offer a set of web services (e.g., related web services). Consequently, the service provider can reuse the so-composed non-functional activities as a knowledge base for other services. Accordingly, and in some examples, a set of actions can be provided and the service provider can select a subset of actions that fulfill the attributes defined in the requirements phase. This can be done, for example, by looking at the satisfied non-functional attribute property of the actions. In some examples, the service provider can determine which actions should be enabled for which operation of the service. Continuing with the example purchase order service, the following can be provided for the example operations:

sendInvoice Incoming: verifySignature, decrypt Outgoing: encrypt, sign sendPurchaseOrder Incoming: log, verifySignature, decrypt, authenticate Outgoing: encrypt, sign getAvailableItemsByCategory Incoming: log, verifySignature, decrypt, authenticate, readFromCache Outgoing: writeToCache,encrypt, sign The so-defined action composition model can be provided for action/activity mapping. In some implementations, the service provider maps individual actions and activities to the purchase order service. The action/activity mapping can be provided within the context of the black box view, the grey box view and the white box view. An example mapping within the context of the black box view is discussed with reference to FIG. 6. An example mapping within the context of the grey box view is discussed with reference to FIG. 7.

Figure 6:
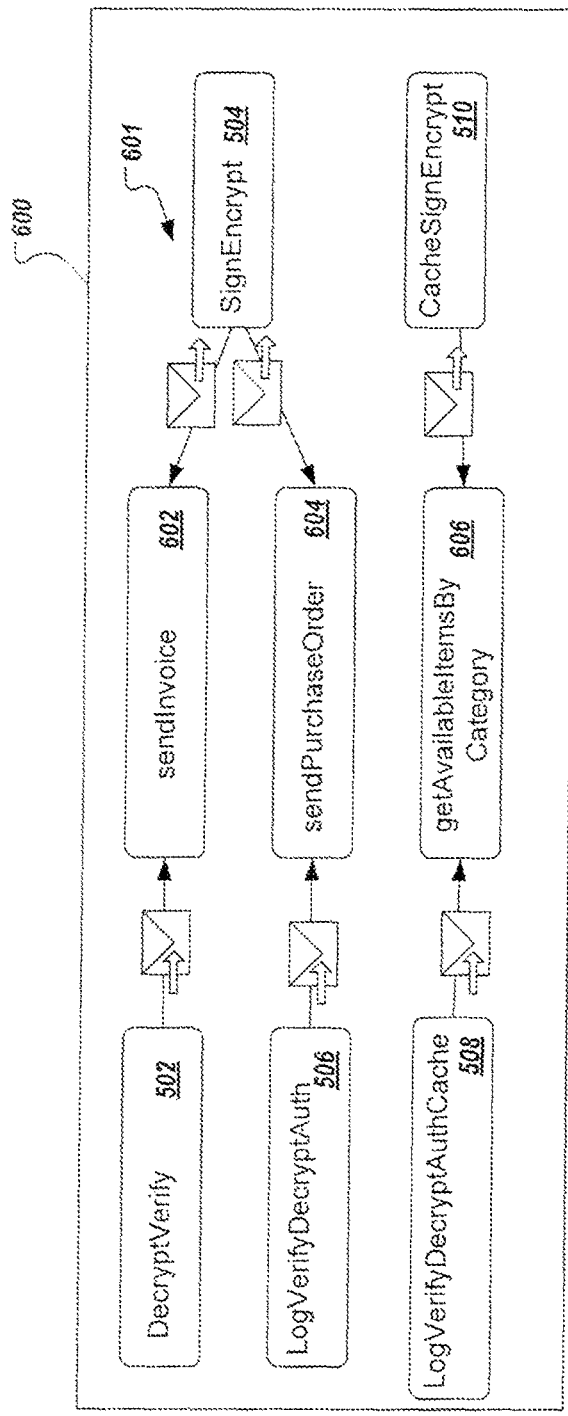
FIG. 6 depicts an example graphical user interface for defining a mapping model from a black box view.

In the context of the black box view, the WSDL file of the example purchase order service can be imported into a mapping editor (e.g., the mapping editor 118 of FIG. 1), which renders the individual operations as respective boxes. FIG. 6 depicts an example graphical interface 600 for generating an action mapping model 601. In the illustrated example, the operations of the example purchase order service are depicted as boxes 602, 604, 606.

In the current example, the interface of the purchase order system (e.g., a web service) is the WSDL file. The subjects for mapping are elements of WSDL. In some examples, the semantics can differ with a service subject. Example WSDL subjects can include operations, input, output, faults, and specific data types used in a message. For instance, a service subject can have the same semantics as applying a non-functional action to all messages independently of the type of message. An input, output or fault service can apply a non-functional action only to corresponding messages. In some implementations, a non-functional action can be mapped directly to the operation, which means it applies to all kinds of messages consumed or produced by the operation. In some implementations, a non-functional action can be mapped directly to individual types (e.g., input, output or fault).

In the depicted example, there are different non-functional requirements depending on the concrete operation of the purchase order service. Consequently, and in this case, the service provider performs the mapping at the operation level.

In this example, it is assumed that only the WSDL interface of the purchase order service is exposed. That is, the mapping phase can apply non-functional actions/activities to certain operations or message types. Further, the data can be extracted from the messages sent to/received by the service in order to be consumed by code that realizes non-functional concerns (e.g. a security concern should be aware of the message and be able to manipulate the message in order to do encryption or signing). In the example of FIG. 6, the action mapping model 601 indicates that, for the sendPurchaseOrder operation 604 for example, incoming messages are to be processed using the LogVerifyDecryptAuth activity 506 and outgoing messages are to be processed using the SignEncrypt activity 504. In some implementations, a non-functional action/activity can be associated with multiple operations (e.g., the SignEncrypt activity 504 is applied to outgoing messages of each of the sendInvoice operation 602 and the sendPurchaseOrder operation 604).

The action mapping model 601 defines the composition logic which can be enforced at run-time of the example purchase order service. In some implementations, execution of the composition logic depends on the corresponding run-time components realizing the composed non-functional actions/activities. For example, middleware web services require the mapping of security or reliable messaging middleware services to actions for implementing the run-time behavior of this action. For example, the WSDL file of a middleware web service can be imported and an operation can be selected. The selection of the operation can lead to mapping the authenticate operation of the security web service to the authenticate action, for example. In some implementations, mapping parameters can be passed to an operation of the middleware service using key-value-pairs. The key is the name of a parameter. For example, the message sent to the target web service in order to parse the authentication information is a value of a key-value-pair.

Continuing with the black box view, having defined the action mapping model (e.g., 601 of FIG. 6), code that enforces the non-functional behavior, defined in the models, is generated. In some examples, the realization is accomplished by a proxy component that interprets the non-functional concern specification, as provided in the action mapping model. In some examples, the service provider installs the proxy in front of the provided web services and changes the address location of the WSDL description to that of the proxy component. Whenever a potential service consumer invokes the web service, the proxy is invoked instead. The proxy executes the middleware services that correspond to the non-functional actions/activities (as specified in the action mapping model). The proxy delegates the message to the target web service. After the web service produces the response, the message is passed to the proxy before it is delivered to the service consumer. In such examples, the proxy is decoupled from the programming platform of the intercepted service in contrast to the common handler approach. This facilitates the reuse of the realization code for different web services no matter which programming language has been used for its implementation.

In some examples, generation of the realization code is supported via a transformer that can be run from an integrated development environment (IDE). For example, the transformer can produce the proxy component with the necessary configuration according to the non-functional concern specification that has been used as input.

Figure 7:
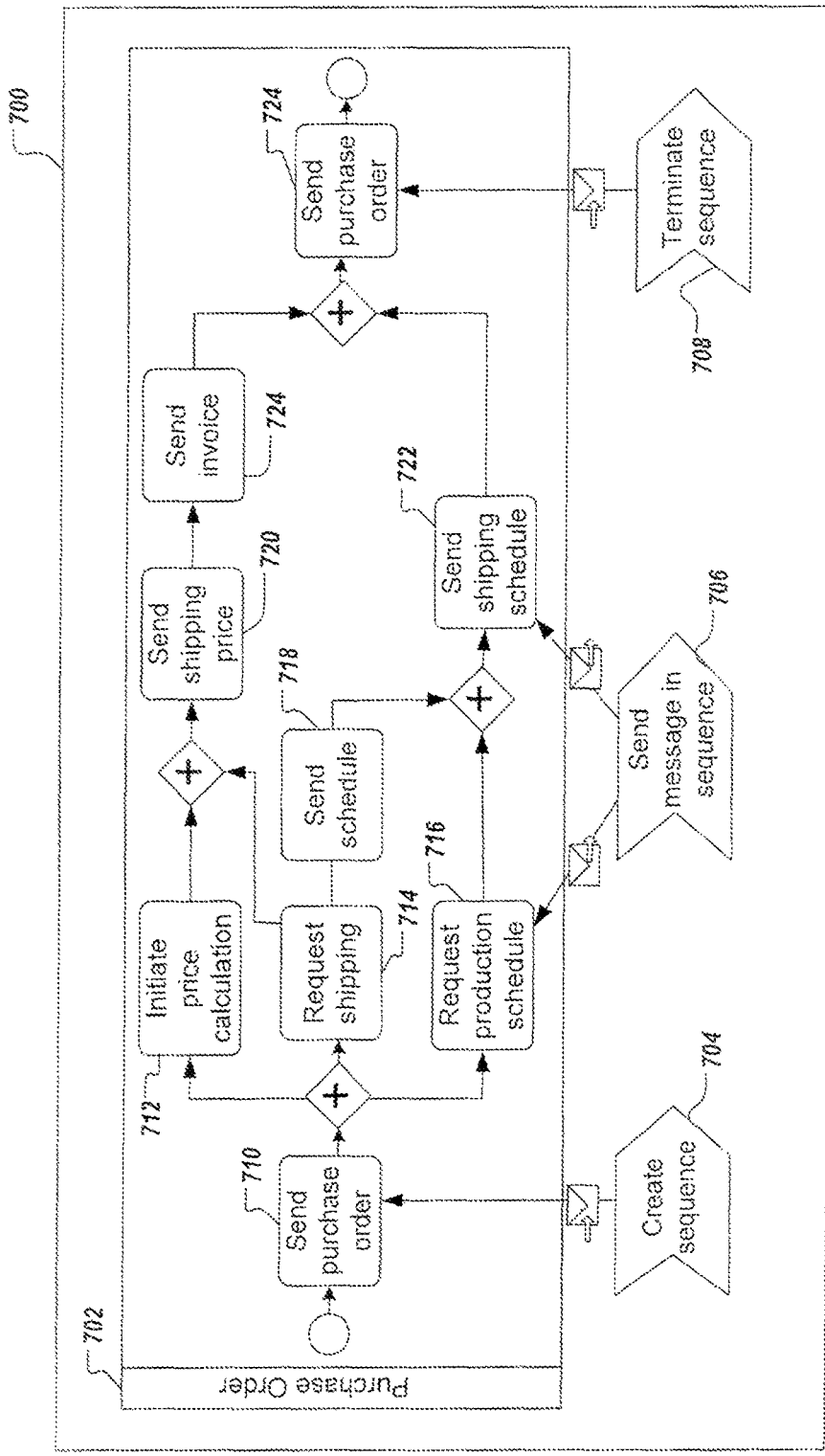
FIG. 7 depicts an example graphical user interface for defining a mapping model from a grey box view.

FIG. 7 depicts an example graphical interface 700 for generating an action mapping model 701 within the context of the grey box view. As illustrated by FIG. 7, the internal details of the process 702 (the purchase order service) are known. The example purchase order service is depicted by the process 702 in BPMN, for example. In the depicted example, operations, the control flow between operations and the communication to external partners (e.g. other web services consumed by the purchase order process: shipping and scheduling services) are provided in the grey box view. For example a send purchase order activity 710 is mapped to a create sequence action 704. The send purchase order activity 710 leads to a node in the control flow, leading to multiple parallel process operations: an initiate price calculation activity 712, a request shipping operation 714 and a request production schedule activity 716. Other activities include a send schedule activity 718, a send shipping price activity 720, a second shipping schedule activity 722, a send invoice activity 724, a send purchase order activity 724.

In the grey box view (e.g., of FIG. 7), the mapping is different as compared to the black box view (e.g., of FIG. 6) where only the WSDL interface is visible. In the grey box view, an action can be mapped to operations as well as to individual activities of a process. This provides for mapping of actions at different points of the process enabling the composition of composite actions by mapping their particular atomic actions to activities. The example of FIG. 7 depicts mapping at the process level. In the example mapping of FIG. 7, the createSequence action 704 is mapped by a before association defining that the reliable messaging sequence should be started before the first activity is executed (when the process is instantiated). The sendMessageInSequence action 706 is mapped to outgoing messages produced by the request-ProductionScheduling activity 716 and the sendSchipping-Schedule activity 722. The terminateSequence action 708 is started after successful execution of the sendPurchaseOrder activity 724.

Continuing with the grey box view, the process modeled in the action mapping model can be modeled in, for example, BPMN2. Accordingly, the action mapping model can be transformed into an executable web service business process execution language (WS-BPEL). In this transformation, the BPEL process and the WSDL files of the partner services can be instrumented based on the defined mapping. If there is a non-functional association of any message type that points to a BPEL messaging activity, an assign activity can be added that copies required metadata (e.g., processId, processInstanceId and activityId) to the message that is being sent to the proxy (discussed above with reference to the black box view). In some examples, a transformation from the action mapping model to an enterprise service bus (ESB) configuration can include adding a switch mediator to the proxy configuration. In some examples, the switch mediator checks against the metadata (e.g., the switch mediator can determine that the mapped non-functional action is only executed if the processId and the activityId match). In some examples, before the proxy delegates the message to the target web service, the proxy removes the metadata. In the case of non-messaging activities used as functional targets, there is no such message that can be used for metadata transportation nor is there any event that the proxy is aware of. Consequently, additional invoke activities can be added to the process to inform the proxy about the execution and to deliver the metadata. In this manner, the proxy is able to determine the current execution context.

Figure 8:
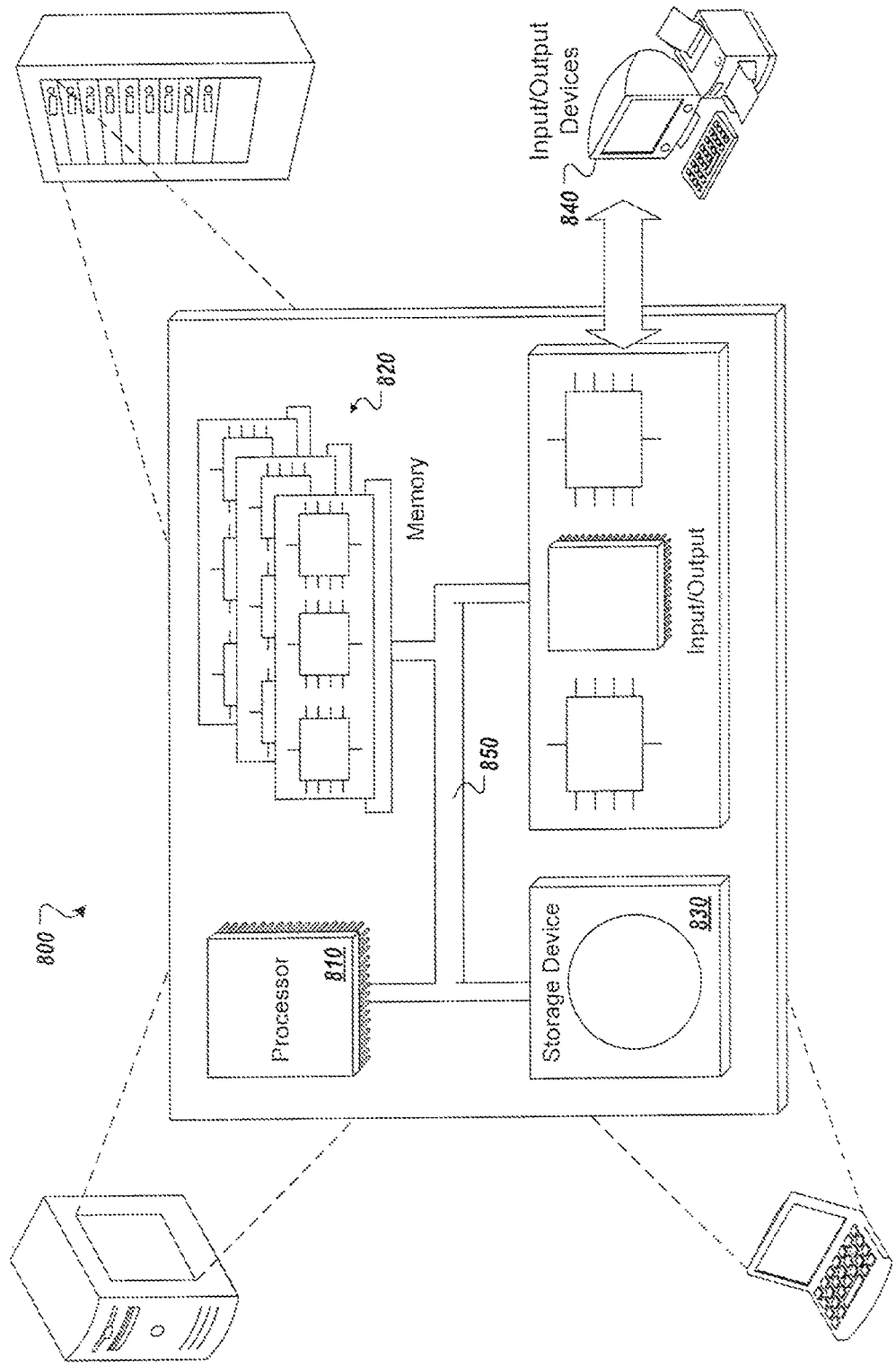
FIG. 8 is an illustration of example computer systems that can be used to execute implementations of the present disclosure.

FIG. 8 depicts an example computing system 800. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In some implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In some implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In some implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of composing a non-functional concern to be implemented with an application, the method being executed using one or more processors and comprising:

receiving a requirements model, the requirements model being provided as a computer-readable artifact and defining a plurality of non-functional requirements and non-functional attributes associated with the non-functional requirements;

for each non-functional attribute provided in the requirements model, identifying one or more actions, properties of each action of the one or more actions and interdependencies between actions of the one or more actions to provide an action model;

defining an action composition model based on the action model, the action composition model being provided as a computer-readable artifact and defining orders of execution of actions and one or more activities, each activity of the one or more activities comprising a plurality of actions;

defining an action mapping model, the action mapping model being provided as a computer-readable artifact and mapping one or more of actions and activities to the application;

generating computer-executable code based on the action mapping model, the computer-executable code being executable to provide the non-functional concern;

storing the computer-executable code in computer-readable memory; and providing the computer-executable code for execution with the application to provide the non-functional concern during execution of the application.

2. The method of claim 1, wherein receiving a requirements model comprises retrieving the requirements model from computer-readable memory.

3. The method of claim 1, wherein receiving a requirements model comprises:

receiving user input;

defining the requirements model based on the user input; and storing the requirements model in computer-readable memory.

4. The method of claim 3, further comprising displaying a graphical interface on a display device, the graphical interface being provided by a computer-executable requirements editor, the user input be received through the graphical interface.

5. The method of claim 1, wherein providing an action model comprises:

receiving user input;

defining the action model based on the user input; and storing the action model in computer-readable memory.

6. The method of claim 5, further comprising displaying a graphical interface on a display device, the graphical interface being provided by a computer-executable action definition editor, the user input be received through the graphical interface.

7. The method of claim 1, wherein defining an action composition model comprises:

receiving user input;

defining the action composition model based on the user input; and storing the action model in computer-readable memory.

8. The method of claim 7, further comprising displaying a graphical interface on a display device, the graphical interface being provided by a computer-executable action composition editor, the user input be received through the graphical interface.

9. The method of claim 1, wherein defining an action mapping model comprises:

receiving user input;

defining the action mapping model based on the user input; and storing the action mapping model in computer-readable memory.

10. The method of claim 9, further comprising displaying a graphical interface on a display device, the graphical interface being provided by a computer-executable action mapping editor, the user input be received through the graphical interface.

11. The method of claim 1, wherein activities comprise at least two actions.

12. The method of claim 1, wherein interdependencies between actions comprise one or more of choice, conflict, mutually exclusive, assistance, requires, precedes and inverse.

13. The method of claim 1, wherein the action mapping model maps one or more of actions and activities to one of operations of the application and activities of the application, operations of the application comprising one or more activities of the application.

14. The method of claim 1, wherein the non-functional concerns address one or more of security, logging, reliability and performance of the application.

15. The method of claim 1, wherein at least one of the action composition model and the action mapping model is provided in business process modeling notation (BPMN).

16. The method of claim 1, wherein the computer-executable code is executable by a proxy that intercepts messages sent to the application, processes the messages based on the non-functional concern to provide processed messages, and transmits the processed messages to the application.

17. The method of claim 1, wherein the computer-executable code is executable by a proxy that intercepts messages sent from the application, processes the messages based on the non-functional concern to provide processed messages, and transmits the processed messages to a customer application.

18. The method of claim 1, wherein the application comprises a web service.

19. A non-transitory computer-readable storage medium coupled to one or more processors and having instructions stored thereon which, when executed by the one or more processors, cause the one or more processors to perform operations for composing a non-functional concern to be implemented with an application, operations comprising:

receiving a requirements model, the requirements model defining a plurality of non-functional requirements and non-functional attributes associated with the non-functional requirements;

for each non-functional attribute provided in the requirements model, identifying one or more actions, properties of each action of the one or more actions and interdependencies between actions of the one or more actions to provide an action model;

defining an action composition model based on the action model, the action composition model defining orders of execution of actions and one or more activities, each activity of the one or more activities comprising a plurality of actions;

defining an action mapping model, the action mapping model mapping one or more of actions and activities to the application;

generating computer-executable code based on the action mapping model, the computer-executable code being executable to provide the non-functional concern;

storing the computer-executable code in computer-readable memory; and providing the computer-executable code for execution with the application to provide the non-functional concern during execution of the application.

20. A system, comprising:

a computing device; and a computer-readable storage device coupled to the computing device and having instructions stored thereon which, when executed by the computing device, cause the computing device to perform operations for composing a non-functional concern to be implemented with an application, operations comprising:

receiving a requirements model, the requirements model defining a plurality of non-functional requirements and non-functional attributes associated with the non-functional requirements;

for each non-functional attribute provided in the requirements model, identifying one or more actions, properties of each action of the one or more actions and interdependencies between actions of the one or more actions to provide an action model;

defining an action composition model based on the action model, the action composition model defining orders of execution of actions and one or more activities, each activity of the one or more activities comprising a plurality of actions;

defining an action mapping model, the action mapping model mapping one or more of actions and activities to the application;

generating computer-executable code based on the action mapping model, the computer-executable code being executable to provide the non-functional concern;

storing the computer-executable code in computer-readable memory; and providing the computer-executable code for execution with the application to provide the non-functional concern during execution of the application.

* * * * *